(12) United States Patent
Voglsinger et al.

(10) Patent No.: US 7,918,421 B2
(45) Date of Patent: Apr. 5, 2011

(54) WING, IN PARTICULAR AIRFOIL OF AN AIRCRAFT, WITH A VARIABLE PROFILE SHAPE

(75) Inventors: Martin Voglsinger, Assling (DE); Juan Perez-Sanchez, Feldkirchen-Westerham (DE)

(73) Assignee: Airbus Deutschland GmbH (DE)

( * ) Notice: Subject to any disclaimer, the term of this patent is extended or adjusted under 35 U.S.C. 154(b) by 482 days.

(21) Appl. No.: 11/312,860

(22) Filed: Dec. 20, 2005

(65) Prior Publication Data

US 2006/0157623 A1 Jul. 20, 2006

(30) Foreign Application Priority Data

Dec. 22, 2004 (DE) .................. 10 2004 062 998

(51) Int. Cl.
*B64C 3/44* (2006.01)
(52) U.S. Cl. ......... 244/219; 244/201; 244/124; 244/132
(58) Field of Classification Search .................. 244/124, 244/200, 201, 215, 219, 132, 213, 214, 216
See application file for complete search history.

(56) References Cited

U.S. PATENT DOCUMENTS

| | | | | |
|---|---|---|---|---|
| 4,113,210 A | * | 9/1978 | Pierce | 244/219 |
| 5,531,407 A | * | 7/1996 | Austin et al. | 244/219 |
| 6,010,098 A | * | 1/2000 | Campanile et al. | 244/219 |
| 6,045,096 A | * | 4/2000 | Rinn et al. | 244/219 |
| 6,145,791 A | | 11/2000 | Diller et al. | 244/215 |
| 6,347,769 B1 | * | 2/2002 | To et al. | 244/219 |
| 6,644,599 B2 | * | 11/2003 | Perez | 244/219 |
| 2002/0100842 A1 | * | 8/2002 | Perez | 244/219 |
| 2005/0103945 A1 | | 5/2005 | Perez-Sanchez | |
| 2006/0145029 A1 | | 7/2006 | Longsinger | |
| 2007/0152106 A9 | * | 7/2007 | Perez-Sanchez | 244/219 |

FOREIGN PATENT DOCUMENTS

| | | |
|---|---|---|
| DE | 27 13 902 | 10/1977 |
| DE | 298 06 408 | 10/1998 |
| DE | 199 36 721 | 2/2001 |
| DE | 103 17 258 | 11/2004 |
| DE | 103 25 950 | 1/2005 |
| EP | 1 205 383 | 11/2001 |
| WO | WO/0247976 | 12/2001 |

OTHER PUBLICATIONS

German Office Action dated Feb. 2, 2009 with English translation of relevant portions.

* cited by examiner

*Primary Examiner* — Tien Dinh
*Assistant Examiner* — Philip J Bonzell
(74) *Attorney, Agent, or Firm* — Ostrolenk Faber LLP

(57) ABSTRACT

A wing, in particular a airfoil of an aircraft, with a variable profile shape, which wing comprises a first skin and a second skin and a supporting structure, arranged between the first and the second skin, which supporting structure in the direction of the wing depth extends between a first end and a second end, wherein the form of said supporting structure, for the purpose of varying the profile shape by means of a drive device comprising drive elements, is variable. The supporting structure comprises ribs, arranged one behind the other in the direction of the wing depth, which ribs at connection positions are interconnected so as to be articulated, wherein said ribs at first connection positions are connected to the first skin, and at second connection positions are connected to the second skin. For the purpose of setting the variable profile the mutual spacing of the second connection positions can be varied by means of the drive elements.

23 Claims, 7 Drawing Sheets

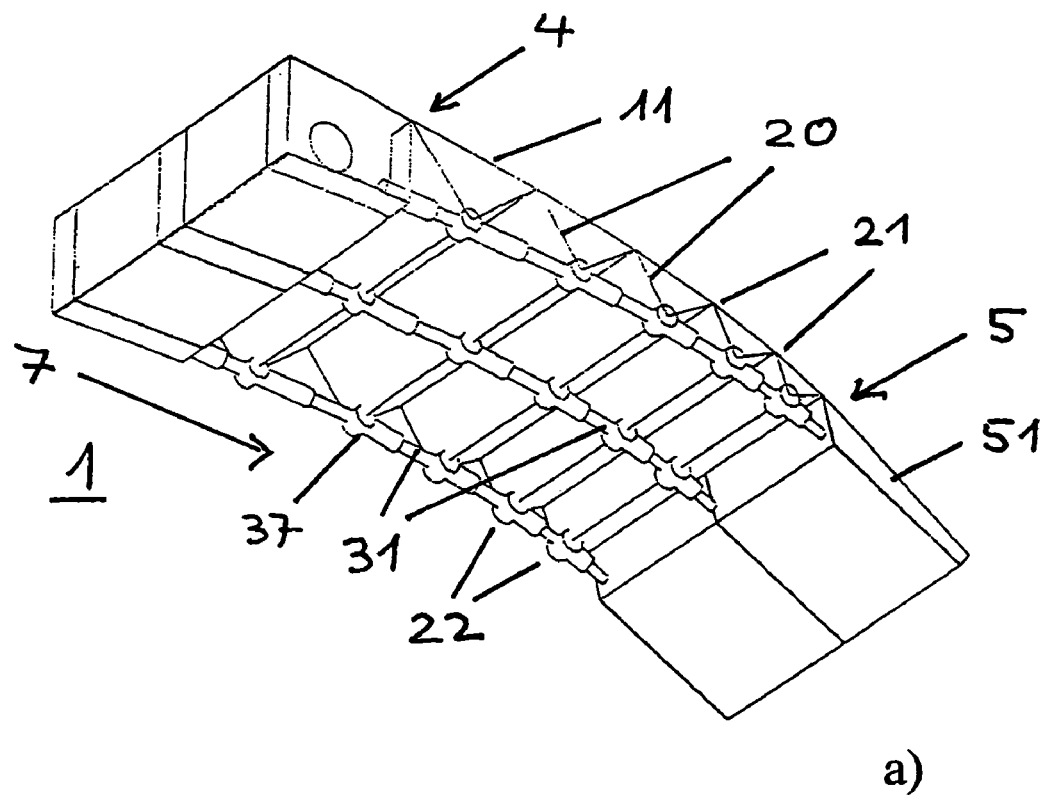
a)
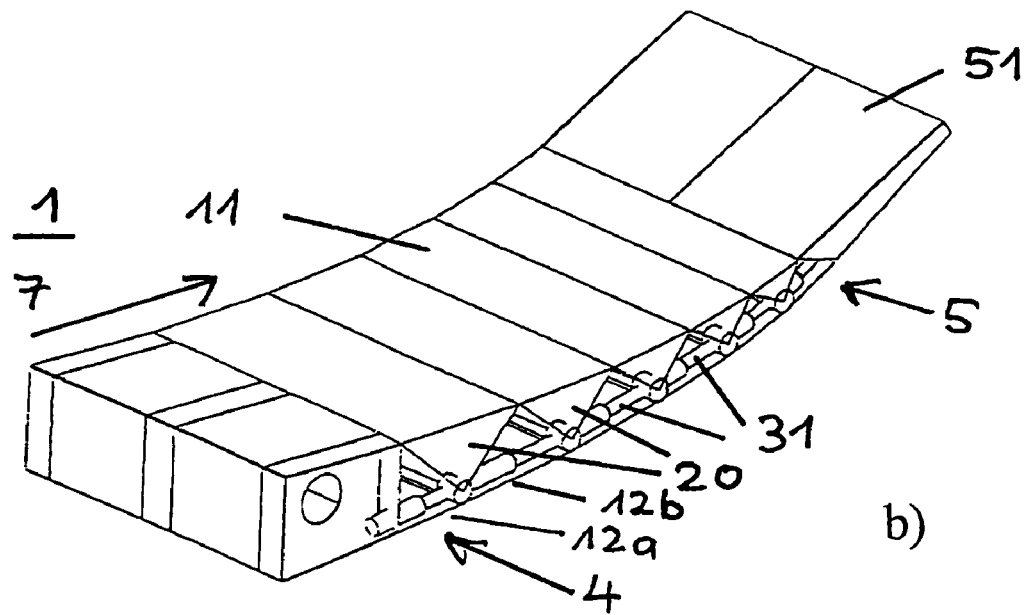
b)
Fig. 2

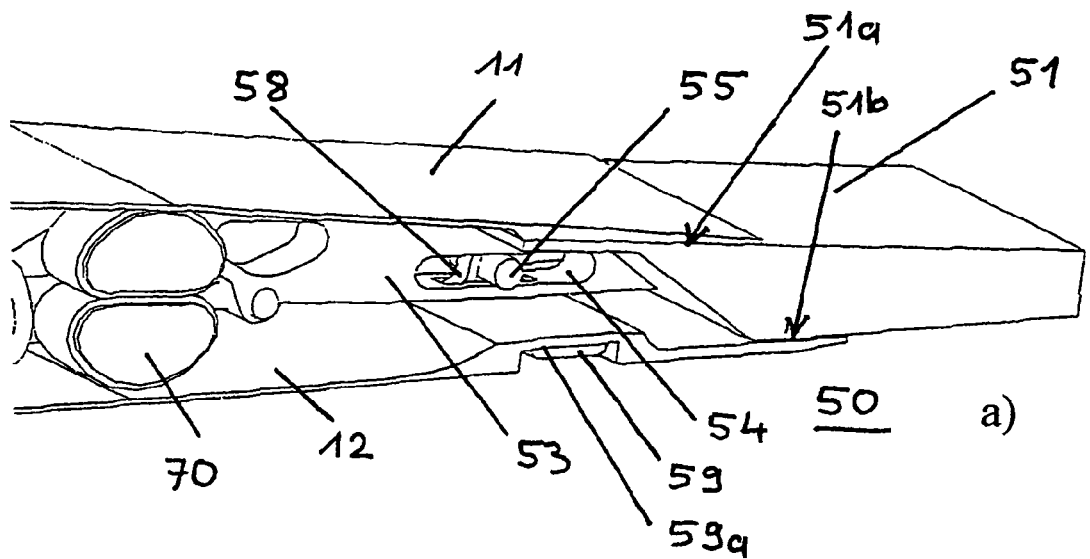
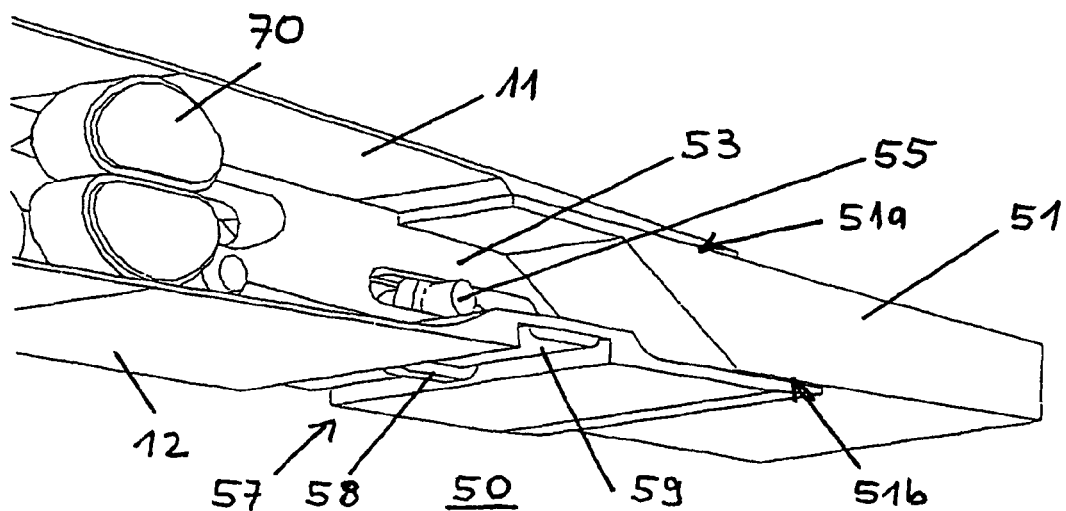
Fig. 6

WING, IN PARTICULAR AIRFOIL OF AN AIRCRAFT, WITH A VARIABLE PROFILE SHAPE

REFERENCE TO RELATED APPLICATION

This application claims the benefit of the filing date of the German Patent Application No. 10 2004 062 998.6 filed Dec. 22, 2004, the disclosure of which is hereby incorporated herein by reference.

FIELD OF THE INVENTION

The invention relates to a wing, in particular a carrying airfoil of an aircraft, with a variable profile shape.

TECHNOLOGICAL BACKGROUND

Conventionally, control flaps that are used to vary the profile of a wing, in particular of the carrying airfoil of an aircraft, but also to vary the profile of rudders and elevators, are made as rigid wing components. By way of these, deflection of the flow on the wing is not optimal from the point of view of aerodynamics, and furthermore the load distribution is unfavourable because the linking of the control flap to individual attachment positions on the wing results in relatively large local stress.

SUMMARY OF THE INVENTION

Amongst other things, it may be an object of the invention to create a wing, in particular a carrying airfoil of an aircraft, having a variable profile, which airfoil has improved aerodynamic characteristics.

According to the invention this object may be met by a wing with the characteristics of claim 1. Advantageous embodiments and improvements of the wing according to the invention are stated in the subordinate claims.

With the invention, a wing, in particular a carrying airfoil of an aircraft, with a variable profile shape is created, which wing comprises a first skin and a second skin and a supporting structure, arranged between the first skin and the second skin, which supporting structure in the direction of the wing depth extends in particular between a first end that is arranged forward in the direction of flow, and a second end that is arranged in particular on the rear in the direction of flow, wherein the form of said supporting structure, for the purpose of varying the profile shape by means of a drive device comprising drive elements, is variable. The supporting structure comprises ribs, arranged one behind the other in the direction of the wing depth, which ribs are interconnected at connection positions so as to be articulated, wherein said ribs at first connection positions are connected to the first skin, and at second connection positions are connected to the second skin, wherein for the purpose of setting the variable profile the mutual spacing of the second connection positions is variable by means of the drive elements.

The wing according to the invention may achieve an improvement of the aerodynamic characteristics of a wing and a reduction in the aerodynamic resistance. Moreover, said wing can be implemented with a clear reduction in weight. Furthermore, the wing according to the invention there may achieve an even load distribution so that local stresses and the associated design expenditure can be avoided.

According to an exemplary embodiment the ribs of the supporting structure are alternately connected at the first connection positions to the first skin, and at the second connection positions to the second skin.

According to an another exemplary embodiment the ribs are arranged so as to be essentially V-shaped in cross section.

According to still another exemplary embodiment the ribs with the first skin form essentially triangular cells in cross section.

According to a further exemplary embodiment the ribs at the second connection positions are connected to the second skin so as to be articulated.

According to a further embodiment of the wing according to the invention the second skin comprises successive skin sections in the direction of the wing depth, which skin sections overlap at least in the retracted state.

According to another exemplary embodiment the second skin is formed by a flexible cover skin which at least in the direction of the wing depth is elastic.

According to an alternative embodiment of the invention the ribs at the second connection positions are connected to the second skin so as to be floating.

In this arrangement the second skin can be formed by a flexible cover skin that is length-neutral in the direction of the wing depth.

According to a further exemplary embodiment of the invention, for floatingly holding the second connection positions to the second skin an unrollable bearing means in the form of a cylinder or truncated cone and a flexible band arrangement that is placed around the unrollable bearing means are provided, wherein free arms that form on the ends of the flexible band arrangement that is placed around the unrollable bearing means are provided, which free arms are attached to the second skin.

According to a further embodiment of the invention the unrollable bearing means and the flexible band arrangement that has been placed around the former provide a play-free joint connection to compensate for relative movements between the skins and/or between the second connection positions and the second skin.

According to an alternative embodiment, on the unrollable bearing means a guide track is provided which extends in the direction of the wing depth and which is interacting with a guiding means being connected to the first skin or to an end piece provided on the second end of the supporting structure, wherein the guide track forms a play-free joint connection to compensate for relative movements between the skins and/or between the second connection positions and the second skin.

The wing according to the invention can be improved in that on the second end of the supporting structure a length compensation device is provided in order to keep the skin, at least in the retracted state, overlapping on an end piece provided on the second end of the supporting structure.

This can be improved in that a guide element with a guide track is provided, which guide element is firmly connected to the first skin, wherein said guide track for the purpose of providing a slide guide interacts with a pin that is connected to the second skin by way of a mounting.

According to another embodiment of the wing according to the invention a profile end piece is provided on the second end of the supporting structure, which profile end piece is connected free of any gaps with the last cell of the wing profile, which cell is formed by the last rib and the first and last skin.

According to one embodiment of the invention the drive device comprises drive elements that can be extended and retracted in the direction of the wing depth, wherein said drive elements are connected to the connection positions that are arranged in the region of the second skin so as to vary the distances between them in relation to each other.

According to another embodiment of the wing according to the invention the drive device comprises at least two drag strut linkages that extend in the direction of the wing depth, which drag strut linkages are connected to the respective second connection positions arranged in the region of the second skin, wherein drive elements are provided that are coupled to the drag strut linkages and that are extendable and retractable across the direction of the wing depth, through which drive elements the distances between the second connection positions can be altered by way of the drag strut linkages.

According to another embodiment of the invention the joints for interconnecting the ribs are elastic joints.

According to still another embodiment of the invention the joints for connecting the ribs to the first skin are elastic joints.

Finally, according to a further embodiment of the invention the joints for connecting the second connection positions to the drive elements of the drive device can be elastic joints.

According to a further embodiment of the wing according to the invention a spacer is provided between the first skin and the second skin, by means of which spacer the skins are kept at a predefined distance, while at the same time relative movement between them is made possible when the wing profile is altered.

According to another embodiment hereof, the spacer comprises a roller-shaped element and a flexible band arrangement for guiding the roller-shaped element in the sense of a roll movement of the roller-shaped element between the first skin and the second skin during relative movement between said skins.

The flexible band arrangement can comprise at least one flexible band that has been placed around the roller-shaped element and with its ends has been fixed to the first and the second skin respectively.

In this arrangement the roller-shaped element can be divided in the middle and, in a reversal of the direction of winding, the flexible band can be fed through the middle of the roller-shaped element and in each instance can be fed half around said roller-shaped element in different directions of winding.

BRIEF DESCRIPTION OF THE DRAWINGS

Below, the embodiments of the invention are explained with reference to the drawings.

In the drawings:

FIG. 2a) shows a perspective view of the airfoil section according to FIG. 1, wherein the view is again obliquely from below, the skin on the side facing the viewer has been left off in the illustration, and the airfoil is in a downward-curved deformation state.

FIG. 2b) shows a perspective view of the airfoil section according to FIG. 1, wherein the view is obliquely from above, and the airfoil is in an upward-curved deformation state that corresponds to the deformation state shown in FIG. 1;

FIGS. 6a) and b) show perspective views of a length compensation device for the free end of the airfoil, wherein the view is obliquely from above and obliquely from below respectively.

DESCRIPTION OF PREFERRED EMBODIMENTS OF THE INVENTION

Figure 1:
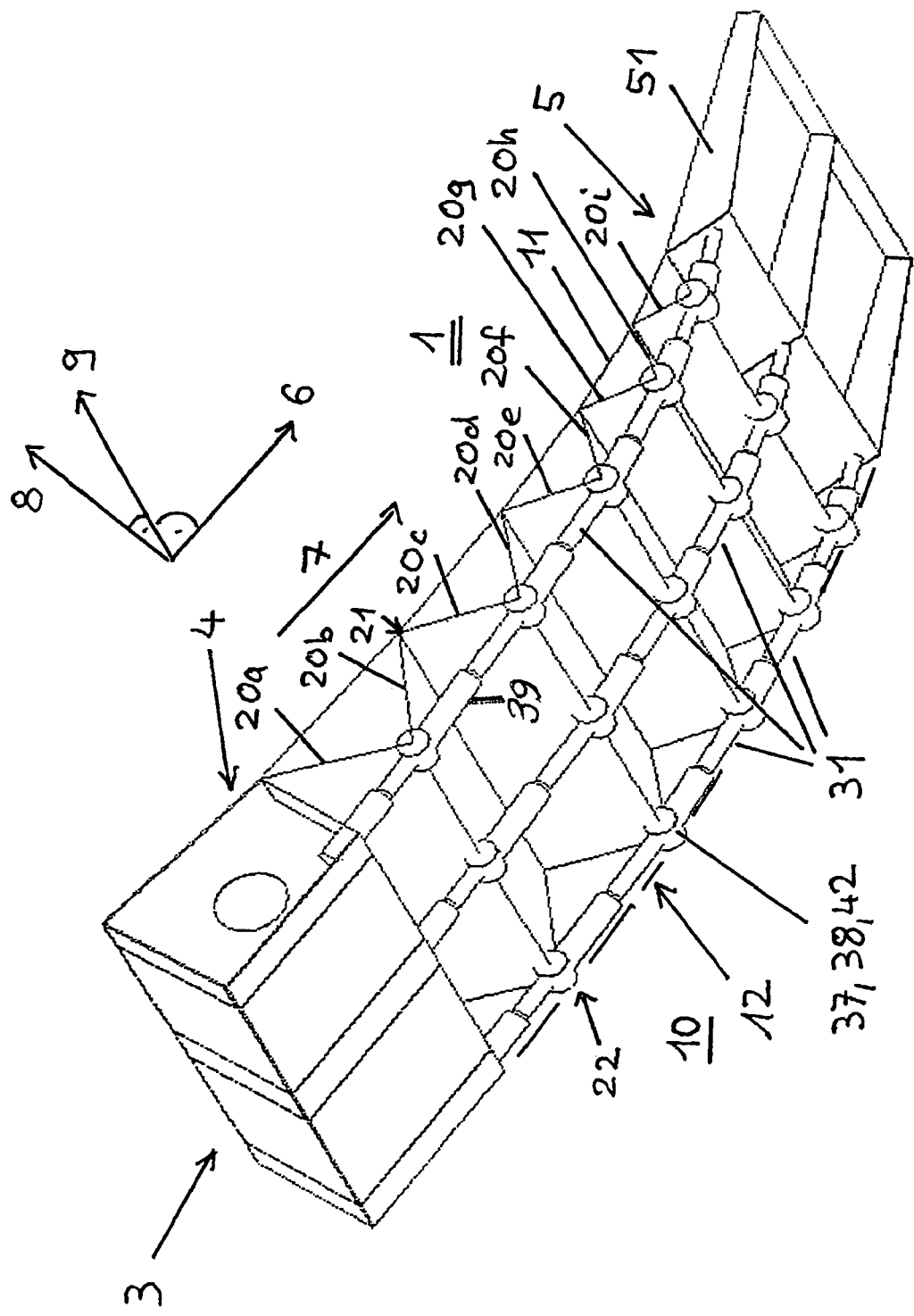
FIG. 1 shows a perspective view of a section of an embodiment of a airfoil with a variable profile with a first embodiment of a drive device for deforming said airfoil, wherein the view is obliquely from below, the skin on the side facing the viewer has been left off in the illustration, and the airfoil is in an upward-curved deformation state.

The airfoil 1 shown in FIGS. 1 to 5 comprises a first end 4 with an attachment position 3 that is intended for attaching the wing to a component or structural part of an aircraft, and a second end 5, which is a free end. The attachment position 3 is suitably fashioned, for example comprising an eyelet which is determined by means of a pin on the structural part of the aircraft. In the embodiment shown in the figures the first end 4 is provided as a front end when viewed in the direction of flow 6, while the second end 5 is provided as a rear end when viewed in the direction of flow 6. According to other embodiments, the wing 1 can however also be arranged in such a way that the second end 5 opposes the direction of flow 6.

The wing 1 can be a carrying airfoil, a rudder, an elevator or some other aerodynamically or hydrodynamically effective control surface. Its use is not limited to aircraft; the principles apply to all types of carrying surfaces and control surfaces that aerodynamically or hydrodynamically interact with a fluid medium as is the case in aircraft and space craft, in ships or in other devices that interact with a fluid, for example also in a wind power station or similar. The variable profile can also form part of, or a section of, a larger airfoil.

The wing 1 comprises a first skin 11 and a second skin 12. The first skin 11 is load-bearing; i.e. a supporting structure 10 that determines the deformation state of the wing 1 is connected to the first skin 11. Furthermore the embodiments described provide for the extension or length in the direction 7 of the wing depth of the first skin 11 to be invariable to bring about the variations in the deformation state of the wing 1. In contrast to this, generally speaking, the change in the deformation state is achieved by way of a change in the position of the elements of the supporting structure 10 in relation to each other and by a change in the length of the second skin 12 in the direction of the wing depth.

The supporting structure 10 comprises ribs or spars 20, which in FIG. 1 are individually designated by the reference characters 20a, 20b, 20c, 20d, 20e, 20f, 20g, 20h and 20i. Each rib 20 extends in the direction 9 of the wing span along part or along the entire span of the wing 1. In the direction 7 of the wing depth the individual ribs 20 are arranged beside each other in a V-shape in such a way that they extend alternately from the skin 11 to the other skin 12 and vice-versa. In this way the ribs 20 create a type of fold arrangement extending in the direction 7 of the wing depth.

In each instance, between each two ribs 20 there are first connection positions 21 on the first skin 11 and second connection positions 22 on the second skin 12. On the first connection positions 21 two ribs 20 are not only connected to each other, but also to the first skin 11. In this arrangement the first connection positions 21 are preferably elastic joints. In a change of the deformation state of the wing 1 the spacing between the adjacent first connection positions 21 along the first skin 11 remains constant.

The variation in the deformation state of the wing 1, i.e. the variation of its profile shape, is achieved by way of a control device (not shown), if need be with regulating functions, wherein said control device by way of corresponding specifications generates control signals for a drive device 30 or 90 with drive elements 31 or 91. To this effect the second connection positions provided on the ribs 20 are coupled to the drive elements 31 or 91 and are interconnected by way of the latter in such a way that the spacing, in the direction of the wing depth, of adjacent second connection positions 22 changes. Thus to change the deformation state of the wing 1 or of the wing section 1a, the spacing, in the direction of the wing depth, of adjacent connection positions 22, which adjoin the second skin 12, is changed by means of the drive elements 31 or 91, while the spacing, in the direction of the wing depth of adjacent connection positions 21, which adjoin the first skin 11, remains unchanged.

In order to ensure that in a change of the spacing of the second connection positions 22 on the second skin 12 in relation to each other at the same time the spacing between the first connection positions 21 on the first skin 11 is maintained, the first skin 11 is designed so as to provide adequate rigidity. To this effect stiffening ribs (not shown) that extend in the direction 7 of the wing depth can be provided, or, as an alternative or in addition, corresponding rigidity can also be achieved by corresponding materials and/or material thicknesses.

The ribs 20 are stiff elements, i.e. during any change of the deformation state of the wing 1 and as a result of external loads and of the dynamic behaviour of the wing 1, if possible, there should be no deflection/bending and warping of the ribs 20.

The drive device 30 or 90 to vary the deformation state and thus the profile shape of the wing 1 can be designed in various ways.

Figure 3:
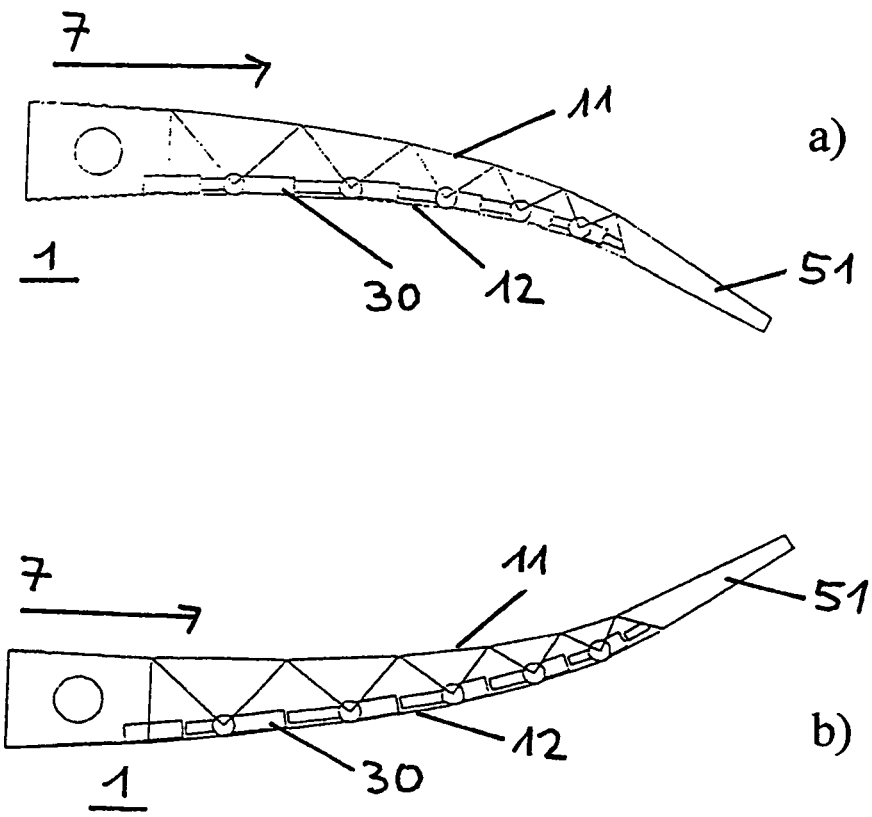
FIGS. 3a) and b) show longitudinal sections of the airfoil of FIG. 1 in a downward-curved deformation state and in an upward-curved deformation state respectively.

In the embodiment shown in FIGS. 1 to 3, the drive elements 31 of the drive device 30 are final control elements that carry out linear, i.e. translatory, control movements. To this effect the drive elements 31, by way of coupling positions 37, are coupled by means of suitable joints 38, directly on or adjacent to the second connection positions 22 of the ribs 20. The ends of the ribs 20, which ends are located at the second connection positions 22, are also coupled to the second skin 12 by way of joints 42. Depending on the embodiment, the joints 38 and 42 can be a single joint or two separate joints. The joints 38 and/or 42 can be elastic joints, i.e. they can be implemented by the flexibility of the material which is provided locally in the region of the coupling position 37 for coupling a rib 20 to a drive element 31 and/or of the second connection positions 22 or the ribs 20. As an alternative, hinged joints or joints of some other type can be provided.

FIG. 1 also illustrates the drag struts 39 extending into the direction of the wing depth, coupled with the drive elements 31, and connected to the second connection positions 22.

Figure 4:
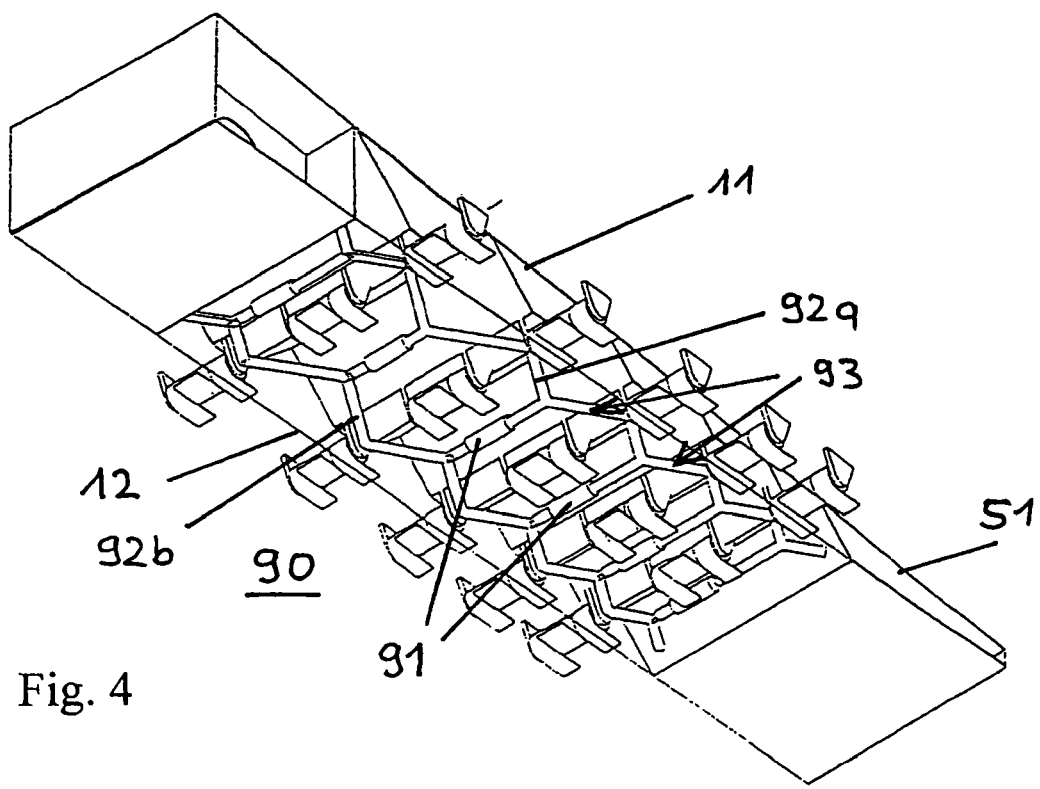
FIG. 4 shows a perspective view of a section of an embodiment of the airfoil according to the invention, with a second embodiment of a drive device for deforming the airfoil, wherein the view is obliquely from below, the skin on the side facing the viewer has been left off in the illustration, and the airfoil is in a neutral deformation state.

Another embodiment of the drive device 90 is shown in FIG. 4. In this arrangement drive elements 91 to vary an adjustment path, which extends across the direction of the wing depth, are arranged between a first scissors linkage 92a and a second scissors linkage 92b. Each of the scissors linkages 92a, 92b is formed by rods 93 that essentially extend in the direction 7 of the wing depth, namely at an angle to said direction 7 of the wing depth, so that scissor linkages 92a, 92b comprise a component in the direction of the wing depth and a component across the direction of the wing depth. Activating the drive elements 21 across the direction of the wing depth shortens or lengthens their component in the direction 7 of the wing depth, and thus the spacing of the second connection positions 22 at the second skin 12 in the direction 7 of the wing depth. At their mutual coupling positions these rods 93 are connected to each other and to the drive elements 91 so as to be articulated, preferably by means of elastic joints or hinges or in some similar manner. Furthermore, the rods 93 are connected, so as to be articulated, to the second connection positions 22 of the ribs 20 in the region of the second skin 12, wherein preferably also elastic joints are used, although the use of hinges or joints of some other type is possible.

Various measures can be taken to make it possible to compensate for the change in the length of the second skin 12 between the first end 4 and the second end 5, and thus in relation to the length-neutral first skin 11 in a change between the spacing of the second connection positions 22 in the direction 7 of the wing depth.

According to a first alternative the second skin 12 can be length-neutral per se, and for example at the second end 5 a length compensation device 50 can be provided.

According to another alternative, the second skin 12 can be provided in the form of several skin sections 12a, 12b, 12c that are arranged one behind the other in the direction 7 of the wing depth.

Finally, a cover skin that is elastic at least in the direction 7 of the wing depth can be provided as a skin, which elastic cover skin compensates for said change in length.

On a case-by-case basis, the ribs 20 on the second skin 12 in the region of the second connection positions 22 can be held either so as to be fixed or so as to be floating in relation to the direction of the wing depth.

In a first embodiment, shown in FIGS. 6a) and 6b), at the second end 5 a length compensation device 50 is provided whose function it is to slidably hold at least one of the two skins (in the embodiment shown the second skin 12) partly overlapping on an end piece 51, and to hold the two skins 11, 12 at a predefined spacing from each other.

In front of the end piece 51 when viewed in the direction 7 of the wing depth, between the skins 11, 12 a guide element 53 with a guide track, for example a groove or a slit-shaped recess 54 is arranged, which is connected, preferably rigidly connected, to the first skin 11. The guide track 54 interacts, in the sense of a slide guide, with a pin 55 which is connected to the second skin 12 by means of a mounting 57. In the embodiment shown this mounting 57 is formed by a plate 59 which on the side opposite the guide device 50 of the second skin 12 is arranged in an indentation 59a. A clamp 58 encompasses both the plate 59 and the pin 55, as a result of which the guide device 50 and thus the second skin 12 are kept at a predefined spacing from the first skin 11. In this arrangement an end section of the first skin 11 rests on a first bearing surface 51a, while the end section of the second skin 12 rests on a second support surface 51b of the end piece 51.

Figure 7:
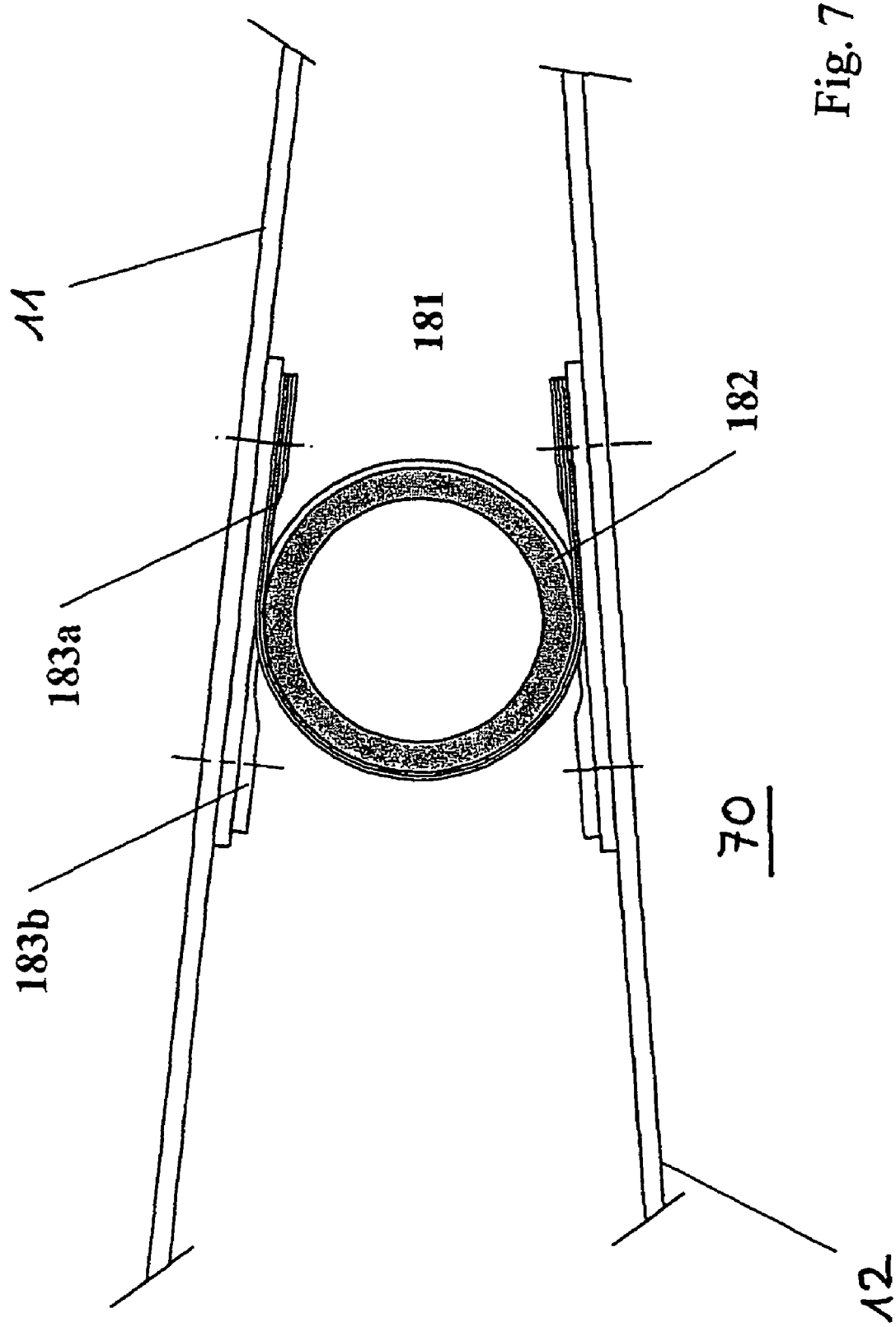
FIGS. 7 and 8 show lateral section views of spacers that hold the first skin and the second skin of a wing at a predetermined distance while at the same time allowing relative displacement of the two in a predetermined direction in relation to each other.
Figure 8:
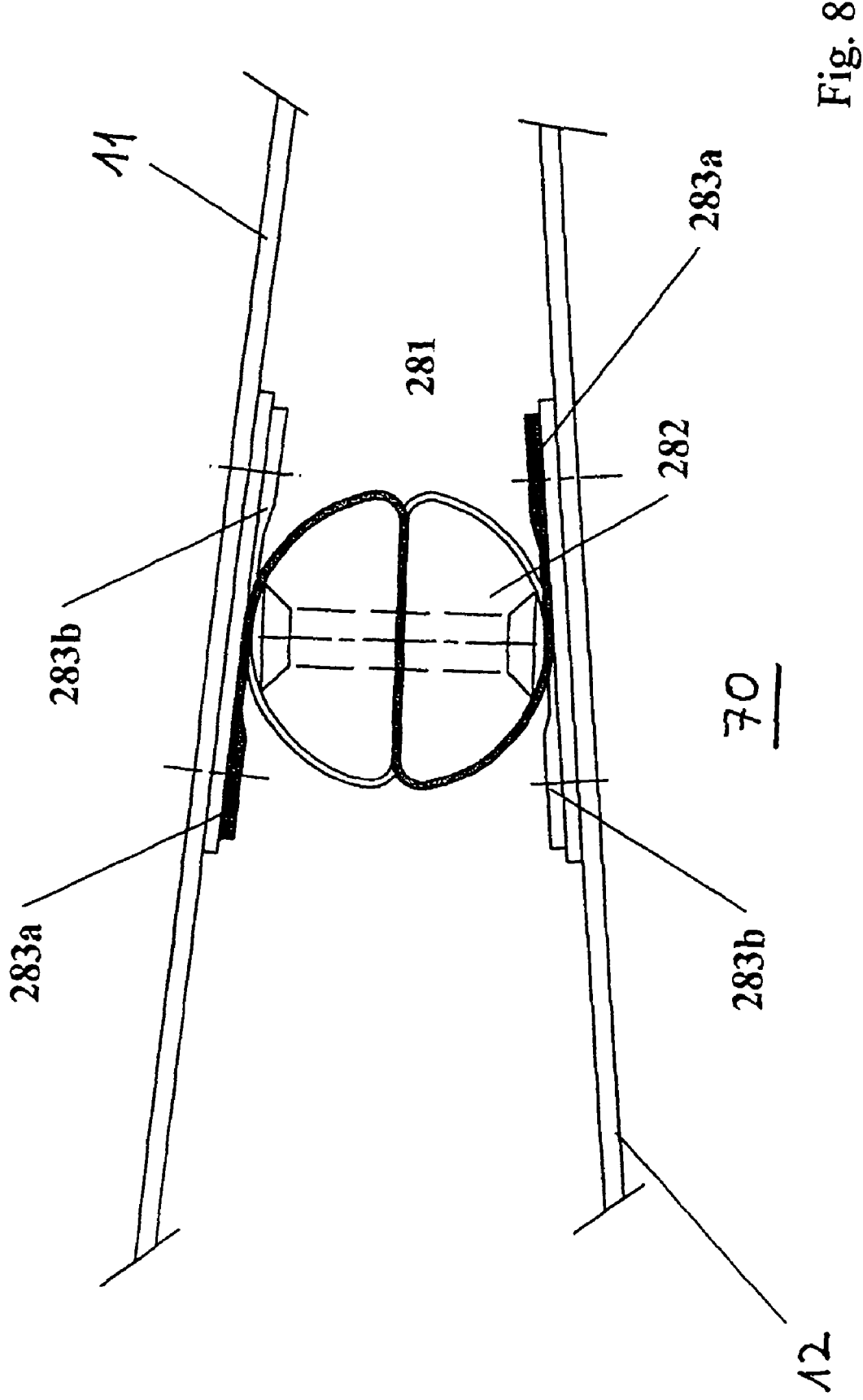

Furthermore, Figures 7 and 8 show spacers 182; 282 that can be provided between the first skin 11 and the second skin 12, by means of which spacers 182; 282 the skins 11, 12 are kept at predefined spacing in relation to each other, while at the same time relative movement to these skins 11, 12 is possible when the wing profile is changed.

Each of these spacers 181; 281, of which two embodiments are shown in FIGS. 7 and 8, contains a roller-shaped element 182; 282 and a flexible band arrangement 183a, 183b; 283a, 283b for guiding the roller-shaped element 182; 282 in the sense of a roll movement of the same between the skins 11, 12 during relative movement between said skins 11, 12. The flexible band arrangement 183a, 183b; 283a, 283b comprises at least one flexible band or spring band that has been placed around the roller-shaped element 182; 282, with the ends of said flexible band being attached to the first skin 11 and to the second skin 12 respectively.

In the embodiment shown in FIG. 8 the roller-shaped element 282 is divided in the middle and in a reversal of the direction of winding, the flexible band 283a, 283b has been fed through the middle of the roller-shaped element 282 and in each instance has been fed half around said element 282 in different directions of winding.

Figure 5:
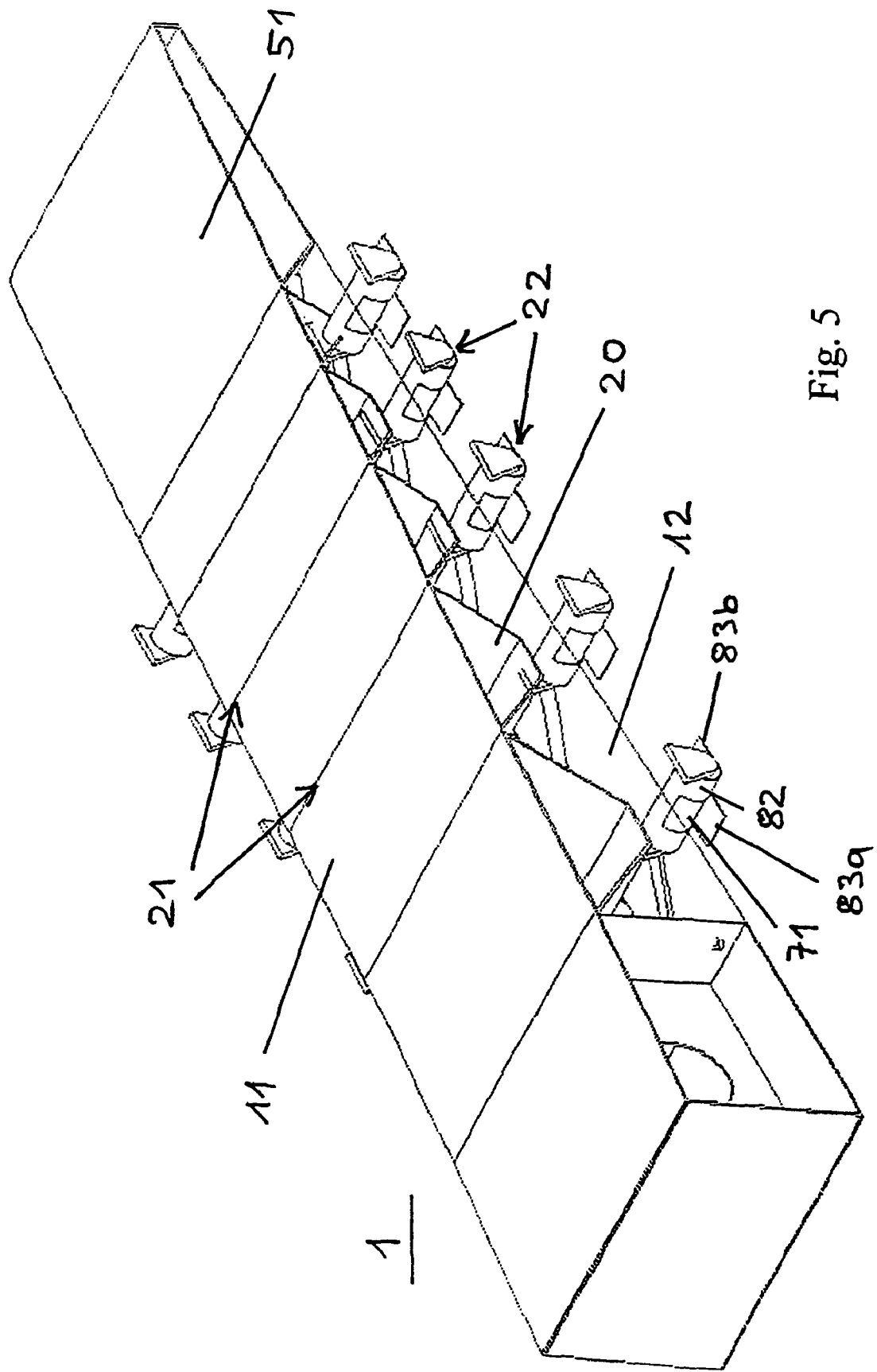
FIG. 5 shows a perspective view of the airfoil section according to FIG. 4, wherein the view is obliquely from above.

FIGS. 4 and 5 show an embodiment in which the second connection positions 22 are floatingly held to the second skin 12, i.e. displacement of the second connection positions 22 towards the second skin 12 in the direction of the wing depth is possible so as to compensate for the change in length between the second connection positions 22 of adjacent ribs 20 in relation to the second skin 12. To this effect an unrollable bearing means in the form of a roller-shaped element, for example a cylinder or truncated cone 82, is provided, wherein a flexible band arrangement in the form of a spring band 71 has been placed around said unrollable bearing means. Free spring arms 83a, 83b that form on said spring band 71 are attached to the second skin 12 and are pre-tensioned against said second skin 12. In this way an unrolling movement of the roller-shaped element 82 in relation to the second skin 12 takes place, which unrolling movement is combined with a mutual longitudinal displacement in the sense of the aforementioned floating bearing arrangement.

What is claimed is:

1. An airfoil configured as part of a wing of an aircraft, the wing having a wing surface, a wing span direction and a wing depth transverse to the wing span direction, the airfoil having a variable profile shape, a first end, and a second end, the airfoil comprising:
    a first skin positioned and configured as part of the wing surface to interact directly with outside airflow on the wing during flight;
    a second skin positioned and configured as part of the wing surface to interact directly with outside airflow on the wing during flight; and
    a supporting structure positioned above the second skin and having a length in a direction of the wing depth between the first end and the second end, the supporting structure comprising:
    a plurality of pairs of ribs positioned in a v-shaped formation such that each rib of each pair of ribs comprises a major surface having a longest side extending in the wing span direction of the wing and such that a portion of the first skin connects open arms of the v-shaped formation and forms a third side of a triangular structure;
    each triangular structure positioned successively along the length of the supporting structure such that a bottom of the v-shaped formation comprises a second connection position connected to the second skin; and
    a drive device including drive elements positioned and configured to vary a profile shape of the airfoil by varying a spacing between adjacent second connection positions.

2. The airfoil of claim 1, the second skin comprising successive skin sections in the direction of the wing depth such that the skin sections overlap in the direction of the wing depth at least in a retracted state.

3. The airfoil of claim 1,
   wherein the ribs at the second connection positions connected to the second skin so as to be floating with respect to the second skin, and the second skin comprises a flexible cover skin length-neutral in the direction of the wind depth.

4. The airfoil of claim 1,
   wherein each second connection position comprises an unrollable bearing positioned between adjacent sections of the second skin, each unrollable bearing including free arms.

5. The airfoil of claim 1, wherein a portion of the first skin contacts directly open arms of the V-shaped formation without any structural element other than the first skin directly connecting the open arms of the V-shaped formation.

6. The airfoil of claim 1, further comprising a profile end piece provided on the second end;
   wherein the profile end piece is connected free of any gaps with a last cell of the airfoil, the cell being formed by a last rib and the first skin.

7. The airfoil of claim 1,
   wherein the drive device comprises at least two drag strut linkages extending in the direction of the wing depth,
   wherein said at least two drag strut linkages are connected to respective second connection positions, and
   wherein the drive elements are coupled to the at least two drag strut linkages and are extendable and retractable across the direction of the wing depth, the drive elements operable to vary distances between the second connection positions by way of the at least two drag strut linkages.

8. The airfoil of claim 1, wherein the supporting structure further comprises elastic joints positioned to interconnect the ribs.

9. The airfoil of claim 1, wherein the supporting structure further comprises elastic joints positioned to connect the ribs to the first skin.

10. The airfoil of claim 1, wherein the second connection position of each V-shaped formation comprises a first joint and a second joint positioned away from the first joint in the wing span direction of the wing, each joint connected to a separate drive element.

11. The airfoil of claim 10, wherein the second connection position comprises a third joint positioned between the first joint and the second joint and in a same plane as the first joint and the second joint, the third joint connected to a drive element separate from the drive elements connected to the first joint and the second joint.

12. The airfoil of claim 1, further comprising a length compensation device provided on the second end configured to keep the skin, at least in the retracted state, overlapping on an end piece provided on the second end.

13. The airfoil of claim 12, further comprising:
    a pin mounted to the second skin;
    a guide element including a guide track, the guide element being firmly connected to the first skin,
    wherein said guide track is positioned and configured to provide a slide guide and interacts with the pin.

14. The airfoil of claim 1, wherein the drive elements are operable to be extended and retracted in the direction of the wing depth, and
    Wherein said drive elements are connected to the second connection positions.

15. The airfoil of claim 14, further comprising elastic joints positioned to connect the second connection positions to the drive elements.

16. The airfoil of claim 1, further comprising a spacer positioned between the first skin and the second skin configured to maintain a predefined distance and to permit relative movement between the first skin and the second skin when the profile shape is altered.

17. The airfoil of claim 16, wherein the spacer comprises a roller-shaped element and a flexible band arrangement for guiding the roller-shaped element during a roll movement of the roller-shaped element between the first skin and the second skin to permit the relative movement between the first skin and the second skin.

18. The airfoil of claim 17, wherein the flexible band arrangement comprises at least one flexible band wound around the roller-shaped element and including ends fixed respectively to the first skin and to the second skin.

19. The airfoil of claim 18,
wherein the roller-shaped element includes a top, a bottom and a middle, and the roller-shaped element is divided in the middle,
wherein the at least one flexible band is fed through the middle of the roller-shaped element in a reversal of a direction of winding, and
wherein the flexible band is fed half around said roller-shaped element and through the middle on each of two sides such that a direction of feeding on the top is opposite a direction of feeding on the bottom.

20. The airfoil of claim 1, further comprising:
a plurality of unrollable bearings, each unrollable bearing of the plurality of unrollable bearings comprising a cylinder or truncated cone positioned between adjacent sections of the second skin and including a flexible band arrangement positioned around each of the unrollable bearings;
each unrollable bearing positioned and configured to floatingly hold the second connection positions to the second skin,
wherein the flexible band arrangement includes free arms at ends of the flexible band arrangement,
wherein the free arms are attached to the second skin.

21. The airfoil of claim 20,
wherein each unrollable bearing and the flexible band arrangement provide a play-free joint connection to compensate for relative movements between the skins and/or between the second connection positions and the second skin.

22. The airfoil of claim 20, further comprising a guide connected to the first skin or to an end piece provided on the second end and positioned on a guide track extending in the direction of the wing depth,
wherein the guide track forms a play-free joint connection to compensate for relative movements between the first skin and the second skin and/or between the second connection positions and the second skin.

23. A wing of an aircraft, the wing having a wing surface, a wing span direction and a wing depth transverse to the wing span direction, the wing comprising an airfoil having a variable profile shape, a first end and a second end, the airfoil comprising:
a first skin configured as part of the wing surface to interact directly with outside airflow on the wing during flight, the first skin positioned at a top major surface of the wing;
a second skin configured as part of the wing surface to interact directly with outside airflow on the wing during flight, the second skin positioned at a lower major surface of the wing;
a supporting structure positioned between the first skin and the second skin and comprising a plurality of v-shaped formations, each v-shaped formation comprising a pair of ribs positioned such that each rib of each pair of ribs comprises a major surface having a longest side extending in the wing span direction of the wing and such that open arms of the v-shaped formation contact the first skin and such that the first skin forms a third side of a triangular structure with the v-shaped formation;
each triangular structure positioned successively along a length of the supporting structure in a flow direction of outside airflow such that a bottom of each v-shaped formation comprises a second connection position connected to the second skin; and
a drive device including drive elements positioned and configured to change a profile shape of the airfoil to achieve a new profile shape by varying a spacing between the second connection position connected to the second skin and an adjacent second connection position connected to the second skin, the adjacent second connection position being a position at a bottom of a second v-shaped formation of the plurality of v-shaped formations,
wherein the first skin provides rigidity sufficient to hold the supporting structure of the airfoil so as to maintain the new profile shape.

* * * * *